Jan. 2, 1968

L. H. CRUSE 3,361,406

HOSE COUPLINGS

Filed June 4, 1965

INVENTOR
LEE H. CRUSE
BY
ATTORNEY

United States Patent Office 3,361,406
Patented Jan. 2, 1968

3,361,406
HOSE COUPLINGS
Lee H. Cruse, Springfield, Mo., assignor to Foster Manufacturing Co., Inc., St. Louis, Mo., a corporation of Missouri
Filed June 4, 1965, Ser. No. 461,404
9 Claims. (Cl. 251—149.7)

ABSTRACT OF THE DISCLOSURE

A hose coupling including male and female coupler elements, the former of which is provided near its end with an outwardly opening groove. The female coupler element includes a barrel having an internal bore sized for slidable reception of the male coupler element. On its outer surface the barrel is provided with an outwardly opening groove into which an elastomeric O-ring is fitted. Radial bores interconnect the groove and internal bore, and fitted into the radial bores are balls which are biased inwardly by the O-ring. Consequently, when the male coupler element is inserted into the internal bore of the barrel the balls will fit into its outwardly opening groove and retain it within the barrel. A sleeve is threadedly mounted on the barrel and includes an internally tapered skirt which overlies and engages the O-ring so that the force exerted by the sleeve on the balls can be varied by rotating the sleeve.

This invention relates to certain new and useful improvements in hose couplings and, more particularly, to a quick-action hose coupling for connecting high pressure air lines of the type usually associated with pneumatic systems.

The primary object of the present invention is to provide a hose coupling of the type stated which is extremely simple in operation and can be easily manipulated to establish a quick, secure, leak-proof connection between two air lines.

It is another object of the present invention to provide a hose coupling of the type stated which embodies a valve means capable of automatically sealing the pneumatic line upon disconnection of the air lines at the coupling.

It is a further object of the present invention to provide a hose coupling of the type stated which is simple and economical in construction, consisting of a comparatively small number of component parts adapted for convenient and quick assembly.

It is an additional object of the present invention to provide a hose coupling of the type stated which is compact and relatively short in length as compared with comparable hose couplings of conventional construction.

It is another object of the present invention to provide a hose coupling of the type stated which is rugged, durable, and will withstand hard use under the most adverse conditions.

With the above and other objects in view, my invention resides in the novel features of form, construction, arrangement, and combination of parts presently described and pointed out in the claims.

In the accompanying drawings (2 sheets)—

Figure 1:
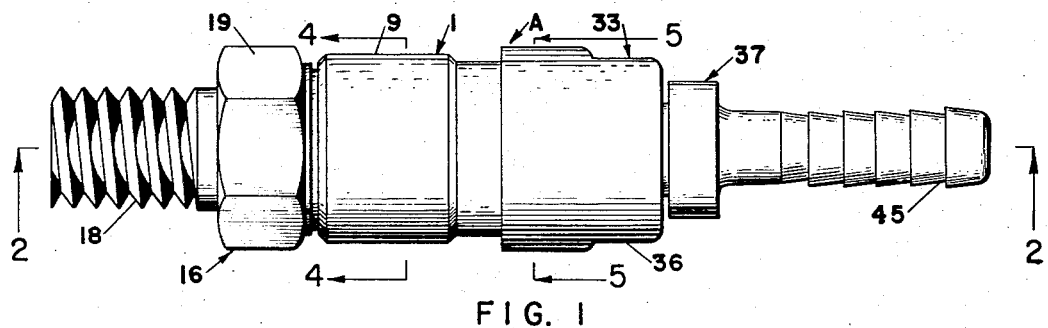
Figure 2:
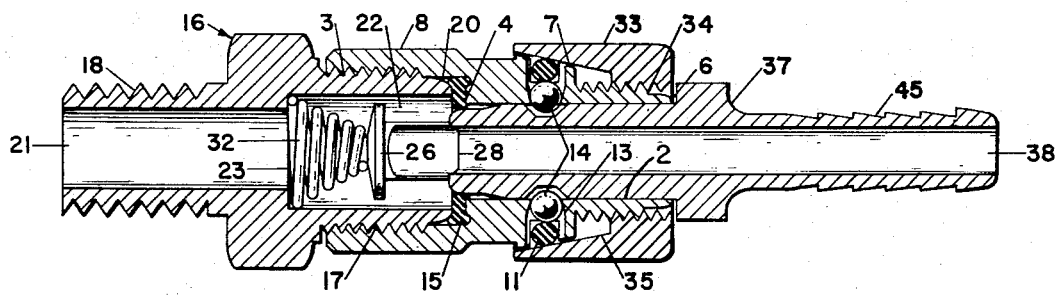
Figure 3:
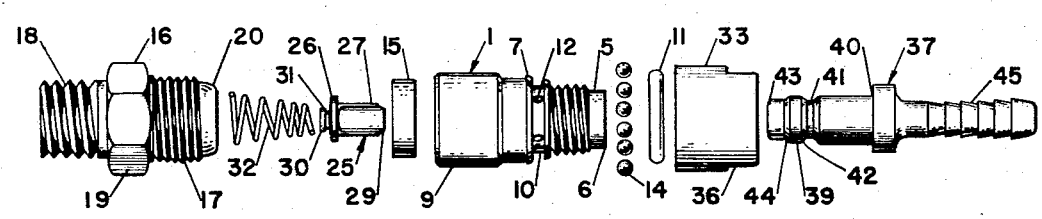
Figure 4:
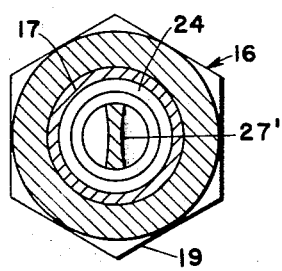
Figure 5:
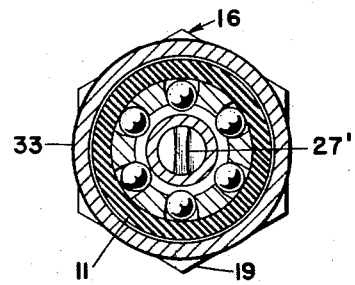

FIG. 1 is a side elevational view of a hose coupling constructed in accordance with and embodying the present invention, FIG. 2 is a longitudinal sectional view taken along line 2—2 of FIG. 1, FIG. 3 is an exploded view of the hose coupling shown in FIG. 1, FIGS. 4 and 5 are transverse sectional views taken along lines 4—4 and 5—5 respectively of FIG. 1.

Figure 6:
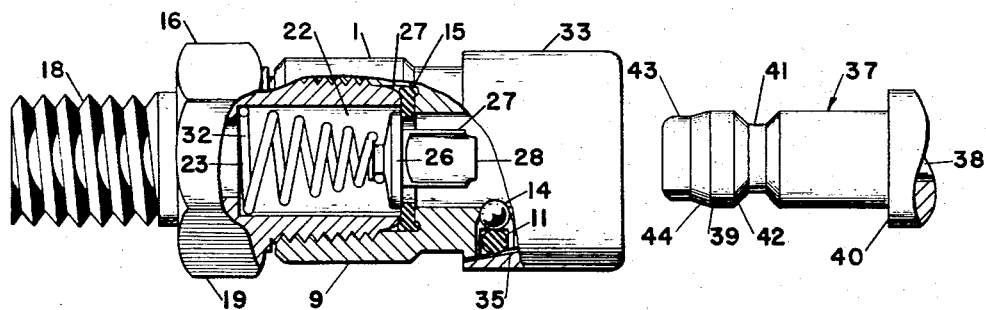

FIG. 6 is an elevational view partly broken away and in section of the hose coupling with the male member removed and the internal valve poppet closed.

Referring now in more detail and by reference characters to the drawings, which illustrate a preferred embodiment of the present invention, A designates a hose coupling comprising a tubular barrel 1 provided at its forward end, reference being made to the right end as shown in FIG. 2, with a forward bore 2 and at its opposite or rear end with an enlarged co-axial bore 3, the bores 2 and 3 being separated by an annular abutment 4 which is perpendicular to the axis of barrel 1. At its forward end, the barrel 1 is externally turned down and threaded in the provision of a nipple 5 which terminates against an annular shoulder 6. The barrel 1 is also provided, rearwardly of the shoulder 6, with an intermediate tapering section 7 incline preferably at ten degrees to the axis of barrel 1. Finally the barrel 1 is provided with a diametrally enlarged rear section 8 having opposed flattened lands 9 sized to fit a standard end wrench or similar hand tool. As will be seen by reference to FIG. 2, the rear section 8 is substantially co-extensive with the rear bore 3, the latter being internally threaded for purposes presently more fully appearing.

The tapered section 7 is relieved in the provision of an annular groove 10 which retains a rubber O-ring 11. As may be seen by reference to FIG. 2, the groove 10 has an axial width equal to the diameter of O-ring 11, but is shallower in depth than the diameter of O-ring 11. Consequently, when O-ring 11 is seated in groove 10 it will project annularly outwardly beyond the tapered section 7. Drilled through the barrel 1, in the region of the groove 10, is a plurality of uniformly spaced radial bores 12 which are tapered at their inner ends in the provision of reduced diameter seats 13 opening into the forward internal bore 2. Loosely disposed in each of the bores 12 is a steel ball 14 which is diametrally greater in size than the seats 13. Thus, the balls 14 are free to move radially within bores 12 and will project inwardly through seats 13 beyond the cylindrical surface of bore 2. The outwardly presented surfaces of the balls 14 will bear against the O-ring 11 which, of course, will retain them within the bores 12, biasing them inwardly against the seats 13. Disposed within rearward bore 3 against annular abutment 4 is a washer 15 formed of any suitable material.

Provided for endwise axial insertion in rearward bore 3 is fitting 16 including an externally threaded forward nipple 17 and an externally threaded rear nipple 18 integrally joined by an intermediate hexagonal body portion 19 which is sized to fit a standard end wrench. The forward nipple 17 is turned down around its forward end in the provision of a rounded nose 20. The fitting 16 is provided internally with an axially extending bore 21 which is counterbored from the forward end to form a diametrally enlarged cylindrical recess 22 having an annular abutment shoulder 23. Thus, when the fitting 16 is threaded into the rear bore 3 of barrel 1, nose 20 will come into sealing abutment with washer 15 forming an internal valve chamber 24.

Operatively disposed within valve chamber 24 is valve poppet 25 including a circular flange 26 provided on its forward face with an axially extending pilot tab 27 having opposed concave lateral faces 27'. The outermost portion of the tab 27 is reduced in the provision of a tongue element 28 and abutment shoulders 29 for purposes presently more fully appearing. The rear face of flange 26 is provided with an axially projecting cylindrical boss 30 which is relieved in the provision of an annular groove 31 for engagement with the forward diametrically reduced end of a tapered coil spring 32. At its rear end the spring 32 abuts against the shoulder 23, thereby biasing the flange 26 against washer 15, all as best seen in FIG. 6.

The hose coupling A also includes an adjustment sleeve 33 integrally including an internally threaded collar 34 adapted for operative engagement with the threaded nipple 5. The sleeve also includes an internally tapered skirt 36 which extends rearwardly from the collar 34 and surrounds the tapered section 7 of the barrel 1, the interior tapered surface of the skirt 35 bearing slidably upon the O-ring 11. Externally the adjustment sleeve is provided with a pair of diametrally opposite flat lands 36 which are sized to fit an end wrench or other similar gripping and turning tool. As the sleeve 33 is turned, it will move rearwardly on the nipple 5, and the O-ring 11, which projects annularly outwardly from the tapered section 7, will, of course, be compressed into groove 10 and bear with greater pressure on the balls 14. Thus, the inward force applied to the balls 14 can be varied by rotating the sleeve 33.

Provided for axial endwise insertion in forward internal bore 2 of barrel 1 is tubular male coupling element or stem 37. Stem 37 is provided with an internal bore 38 which extends axially therethrough and is diametrically sized to receive the tongue element 28 of pilot tab 27. The rearward portion of stem 37, that is to say, the left end as shown in FIG. 2, is machined to form a cylinder 39 which terminates in an outwardly projecting annular shoulder 40. Cylinder 39 is relieved in the provision of a retention groove 41 having inclined walls 42. The rearward portion of cylinder 39 is turned down slightly in the provision of a nipple 43 and a gently beveled surface 44. The locations of the retention groove 41 and nipple 43 are such that when the stem 37 is fully inserted within the bore 2, that is to say when shoulder 40 abuts against nipple 5, the nipple 43 will project slightly beyond the annular abutment 4 into the bore 3, while the retention groove 41 will be disposed annularly within a circle defined by the seats 13 and the balls 14. The forward surface of stem 37 extending beyond shoulder 40 is fluted to form a hose stem 45 which is sized to fit within a standard rubber hose used in pneumatic systems.

In operation, the fitting 16 is connected to the high pressure side of a pneumatic line in any conventional manner. The stem 37 is inserted within the forward internal bore 2 and is pushed rearwardly toward the washer 15. The nipple 43 will pass between the annularly disposed balls 14, whereupon the beveled surface 44 will cam the balls radially outwardly in the bores 12 causing them to ride over the cylinder 39. Upon further advancement of the stem 37, the balls 14 will be pressed by the O-ring 11 into the annular retention groove 41. Further, the internal bore 38 of stem 37 will engage tongue element 28, thereby preventing radial movement of the poppet valve 25. The rearward annular end of nipple 43 will bear against the shoulders 29 of pilot tab 27 and push the flange 26 away from the rearward surface of the washer 15. When the stem 37 is completely inserted in the internal bore 2, that is to say, when shoulder 40 abuts against the forward surface of washer 15, thereby creates an air-tight seal. The balls 14, of course, project into the annular retention groove 41, and prevent the stem 37 from moving axially forward, that is, to the right in FIG. 2, by bearing against the rearward inclined wall 42. Thus, balls 14 serve as locking elements.

To remove the stem 37 from the barrel 1, one need only grasp the two components and pull them apart. In so doing, the balls 14 will be cammed radially outwardly in the holes 12 and against the O-ring 11 by the inclined wall 42. The spring 32 will force the flange 26 into sealing engagement with thte washer 15, thereby automatically sealing the pneumatic line. The pressure within the valve chamber 24 will further press the flange 26 against the washer 15 assuring a tight fitting seal.

The resistance which the balls 14 provide against the removal of stem 37 can be varied by adjusting the sleeve 33 which as previously described controls the force the O-ring 11 asserts against the balls 14.

It should be understood that changes and modifications in the form, construction, arrangement, and combination of the several parts of the hose coupling may be made and substituted for those herein shown and described without departing from the nature and principle of my invention.

Having thus described my invention, what I claim and desire to secure by Letters Patent is:

1. A quick-acting hose coupling for receptive engagement with a mating coupler element, said mating coupler element having an external annular groove, said hose coupling comprising a tubular barrel having walls defining an axially extending internal bore which accepts said mating coupler element, said walls being provided with at least one radially extending bore which communicates with said internal bore, a ball disposed in said radially extending bore, said radially extending bore being adapted to permit said ball to extend partially into said internal bore, a resilient member formed from an elastomeric material overlying and engaging the ball for biasing the ball toward the internal bore, and means for varying the biasing force exerted by the resilient member on the ball.

2. A quick-acting hose coupling for receptive engagement with a mating coupler element, said mating coupler element having an external annular groove, said hose coupling comprising a tubular barrel having walls defining an axially extending internal bore which accepts said mating coupler element, said walls being provided with a plurality of axially co-planar radially extending bores which are in communication with said internal bore, said walls being provided with seats having diametrally reduced apertures at each juncture of said radially ertending bores and said internal bore, a ball disposed in each radial bore, said balls being diametrally greater in size than said apertures and diametrally smaller in size than said radial bores, a resilient member disposed around said tubular barrel in encircling relationship to said balls, said resilient member being adapted to bear against the outwardly presented surfaces of said balls and bias said balls toward said seats, thereby causing a portion of each of said balls to project inwardly through said apertures into said internal bore, and a means for varying the force exerted by said resilient member on said balls.

3. A quick-acting hose coupling for receptive engagement with a mating coupler element, said mating coupler element having an external annular groove, said hose coupling comprising a tubular barrel having a circular cross-section and walls defining an axially extending internal bore which accepts said mating coupler element, said walls being provided with a plurality of axially co-planar radially extending bores which are in communication with said internal bore, said walls being provided with seats having diametrally reduced apertures at each juncture of said radially extending bores and said internal bore, a ball disposed in each radial bore, said ball being diametrally greater in size than said apertures and diametrally smaller in size than said radial bores, a resilient member disposed around and projecting annularly outwardly from said tubular barrel in encircling relationship to said balls, said resilient member being adapted to bear against the outwardly presented surfaces of said balls and bias said balls toward said seats, thereby causing a portion of each of said balls to project inwardly through said apertures into said internal bore, a sleeve disposed around said resilient member, and means for varying the diameter of said sleeve in juxtaposition to said resilient member.

4. A quick-acting hose coupling for receptive engagement with a mating coupler element, said mating coupler element having an external annular groove, said hose coupling comprising a tubular barrel having walls defining an axially extending internal bore and an outwardly presented tapered section, said internal bore being adapted to accept said mating coupler element, said walls being provided with a plurality of axially co-planar radially extending bores which are in communication with said internal bore and said tapered section, said walls being provided with seats having diametrally reduced apertures at each juncture of said radially extending bores and said internal bore, a ball disposed in each radial bore, said balls being diametrally greater in size than said apertures and diametrally smaller in size than said radial bores, a resilient member disposed around and projecting annularly outwardly from said tapered section in encircling relationship to said balls, said resilient member being adapted to bear against the outwardly presented surfaces of said balls and bias said balls toward said seats, thereby causing a portion of each of said balls to project inwardly through said apertures into said internal bore, and a sleeve operatively mounted for axial movement on said barrel, said sleeve having a wall defining an inwardly presented tapered section, said tapered section being parallel to the outwardly presented tapered section of said barrel, said inwardly presented tapered section being adapted to bear against said resilient member, thereby causing said resilient member to bear with greater force on said balls.

5. A quick-acting hose coupling for receptive engagement with a mating coupler element, said mating coupler element having an external annular groove, said hose coupling comprising a tubular barrel having walls defining an axially extending internal bore and an outwardly presented tapered section, said internal bore being adapted to accept said mating coupler element, said tapered section being relieved in the provision of an annular groove, said walls being provided with a plurality of axially co-planar radially extending bores which are in communication with said internal bore and said groove, said walls being provided with seats having diametrally reduced apertures at each juncture of said radially extending bores and said internal bore, a ball disposed in each radial bore, said balls being diametrally greater in size than said apertures and diametrally smaller in size than said radial bores, a resilient member disposed in said groove in encircling relationship to said balls and projecting annularly outwardly beyond said tapered section, said resilient member being adapted to bear against the outwardly presented surfaces of said balls and bias said balls toward said apertures, thereby causing a portion of said balls to project inwardly through said apertures into said internal bore, and a sleeve threadedly mounted for axial movement on said barrel, said sleeve having a wall defining an inwardly presented tapered section, said inwardly presented tapered section being parallel to the outwardly presented tapered section of said barrel, said inwardly presented tapered section being adapted to bear against said resilient member, thereby causing said resilient member to bear with greater force on said balls.

6. A quick-acting hose coupling for receptive engagement with a mating coupler element, said mating coupler element having an external annular groove, said hose coupling comprising a tubular barrel having walls defining an axially extending internal bore and an outwardly presented tapered section, said internal bore being adapted to accept said mating coupler element, said walls being provided with a plurality of axially co-planar radially extending bores which are in communication with said internal bore and said tapered section, said walls being provided with seats having diametrally reduced apertures at each juncture of said radially extending bores and said internal bore, a ball disposed in each radial bore, said balls being diametrally greater in size than said apertures and diametrally smaller in size than said radial bore, an elastomeric O-ring disposed around and projecting annularly outwardly from said tapered section in encircling relationship to said balls, said O-ring being adapted to bear against the outwardly presented surfaces of said balls and bias said balls toward said seats, thereby causing a portion of each of said balls to project inwardly through said apertures into said internal bore, and a sleeve operatively mounted for axial movement on said barrel, said sleeve having a wall defining an inwardly presented tapered section, said tapered section being parallel to the outwardly presented tapered section of said barrel, said inwardly presented tapered section being adapted to bear against said O-ring, thereby causing said O-ring to bear with greater force on said balls.

7. A quick-acting hose coupling for receptive engagement with a mating coupler element, said mating coupler element having an external annular groove, said hose coupling comprising a tubular barrel having walls defining an axially extending internal bore and an outwardly presented tapered section, said internal bore being adapted to accept said mating coupler element, said tapered section being relieved in the provision of an annular groove, said walls being provided with a plurality of axially co-planar radially extending bores which are in communication with said internal bore and said groove, said walls being provided with seats having diametrally reduced apertures at each juncture of said radially extending bores and said internal bore, a ball disposed in each radial bore, said balls being diametrally greater in size than said apertures and diametrally smaller in size than said radial bores, a rubber O-ring disposed in said groove in encircling relationship to said balls and projecting annularly outwardly beyond said tapered section, said O-ring being adapted to bear against the outwardly presented surfaces of said balls and bias said balls toward said apertures thereby causing a portion of said balls to project inwardly through said apertures into said internal bore, and a sleeve threadedly mounted for axial movement on said barrel, said sleeve having a wall defining an inwardly presented tapered section, said inwardly presented tapered section being parallel to the outwardly presented tapered section of said barrel, said inwardly presented tapered section being adapted to bear against said O-ring, thereby causing said O-ring to bear with greater force on said balls.

8. A hose coupling for receptive engagement with a mating coupler element having an outwardly opening groove, said hose coupling comprising a barrel having an internal bore sized for slidable reception of the mating coupler element, the barrel having a plurality of generally radial bores which open into the internal bore, locking elements shiftably mounted within the radial bores for substantially radial movement, a resilient member embracing the barrel and being in overlying engagement with the locking elements so as to bias the locking elements inwardly for retentive engagement with the groove of the mating coupler element whereby the mating coupler element is retained within the internal bore, and means for varying the force exerted by the resilient member on the locking elements.

9. A hose coupling according to claim 8 wherein the means for varying the force exerted by the resilient member is a sleeve mounted for axial shifting movement on the barrel and having a tapered inwardly presented surface in engagement with the resilient member, whereby the force exerted by the resilient member is dependent on the axial disposition of the sleeve on the barrel.

References Cited

UNITED STATES PATENTS

| | | | |
|---|---|---|---|
| 2,448,688 | 9/1948 | Scheiwer | 285—304 |
| 2,536,702 | 1/1951 | Scheiwer | 251—149.7 |
| 2,599,280 | 6/1952 | Phillips | 285—276 |

M. CARY NELSON, *Primary Examiner.*

W. R. CLINE, *Assistant Examiner.*